INVENTORS
VICTOR RAEBER
MAURICE BONJOUR
BY Emory L. Groff Jr.
ATTORNEY

INVENTORS
VICTOR RAEBER
MAURICE BONJOUR
BY Emary L. Groff
ATTORNEY

INVENTORS
VICTOR RAEBER
MAURICE BONJOUR
BY Emery L. Groff Jr.
ATTORNEY

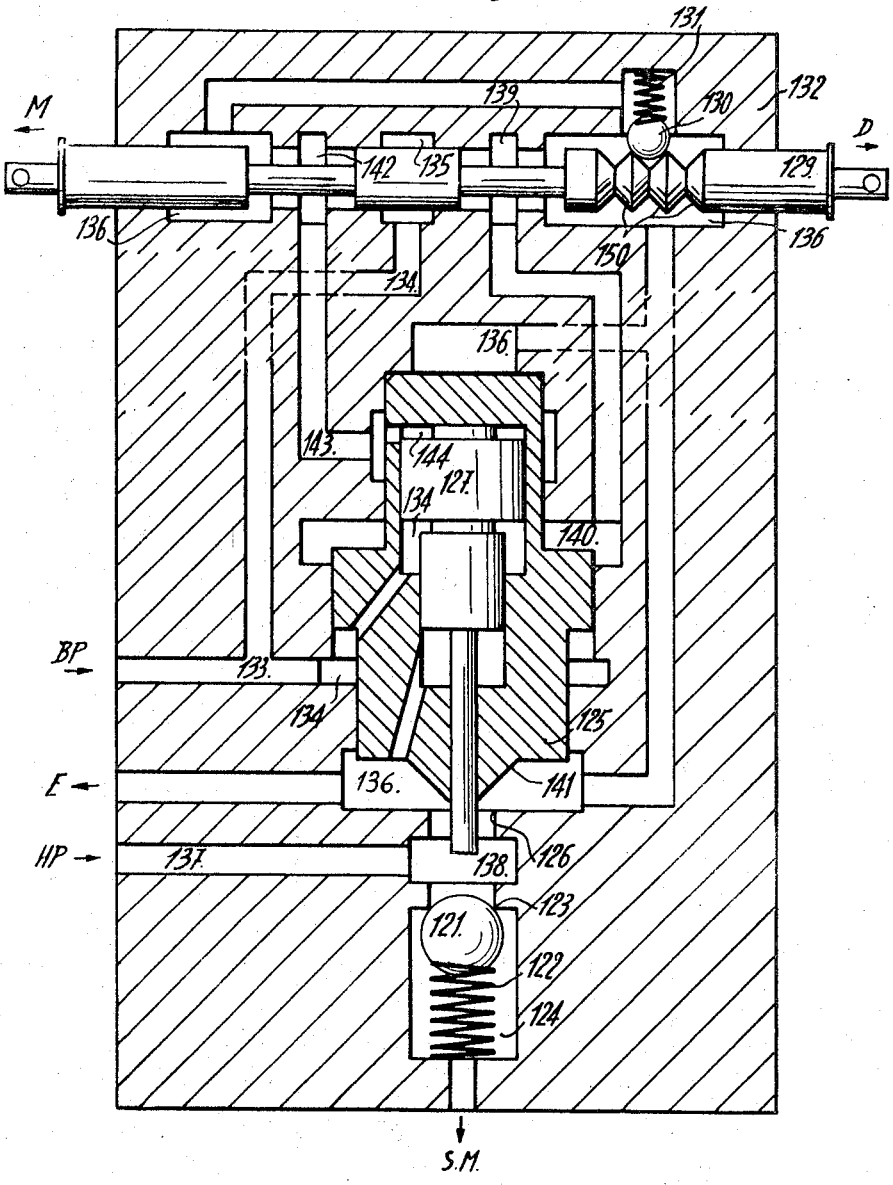

United States Patent Office 3,306,367
Patented Feb. 28, 1967

3,306,367
HYDRAULIC CONTROL ARRANGEMENT
Victor Raeber and Maurice Bonjour, Vevey, Switzerland, assignors to Ateliers de Constructions Mecaniques de Vevey S.A., Vevey, Switzerland, a corporation of Switzerland
Filed Feb. 10, 1964, Ser. No. 343,874
9 Claims. (Cl. 172—4)

Machines equipped with an arrangment for raising or lowering loads are frequently used. The embodiments of such machines are of various types and resort either to electric means including a motor driving a winch or else to pneumatic means including an auxiliary power unit operated through compressed air or again to hydraulic means including an auxiliary oil-operated power unit.

The present invention relates to a hydraulic control system comprising at least one supply of oil under pressure, at least one auxiliary hydraulic power unit of the piston and cylinder type and at least one distributor feeding oil to the auxiliary power unit with a view to controlling the movements of the latter, said distributor including at least one chamber communicating on the one hand with the cylinder of the auxiliary power unit through a hydraulic channel and on the other hand with the supply of oil under pressure through a further channel; according to the invention, the distributor includes at least one valve closing last-mentioned channel and providing for the fluidtightness of said chamber when it is subjected to oil pressure, and means controlling a port for connecting said chamber with the exhaust.

Such an arrangement may in particular be applied on board a vehicle such as an agricultural tractor so as to allow the raising of a load. The load may be constituted for instance by a plough which is raised by the tractor driver once the tilling of a furrow has been completed so that he may make the tractor turn around easily and position the machine in order to engage the following furrow. When this position has been reached, the driver lowers the plough through the same arrangement and continues operating.

In the accompanying drawing illustrating an embodiment of the invention:

FIGURE 5 illustrates a further structure for a distributor incorporated with the proposed arrangement.

Figure 1:
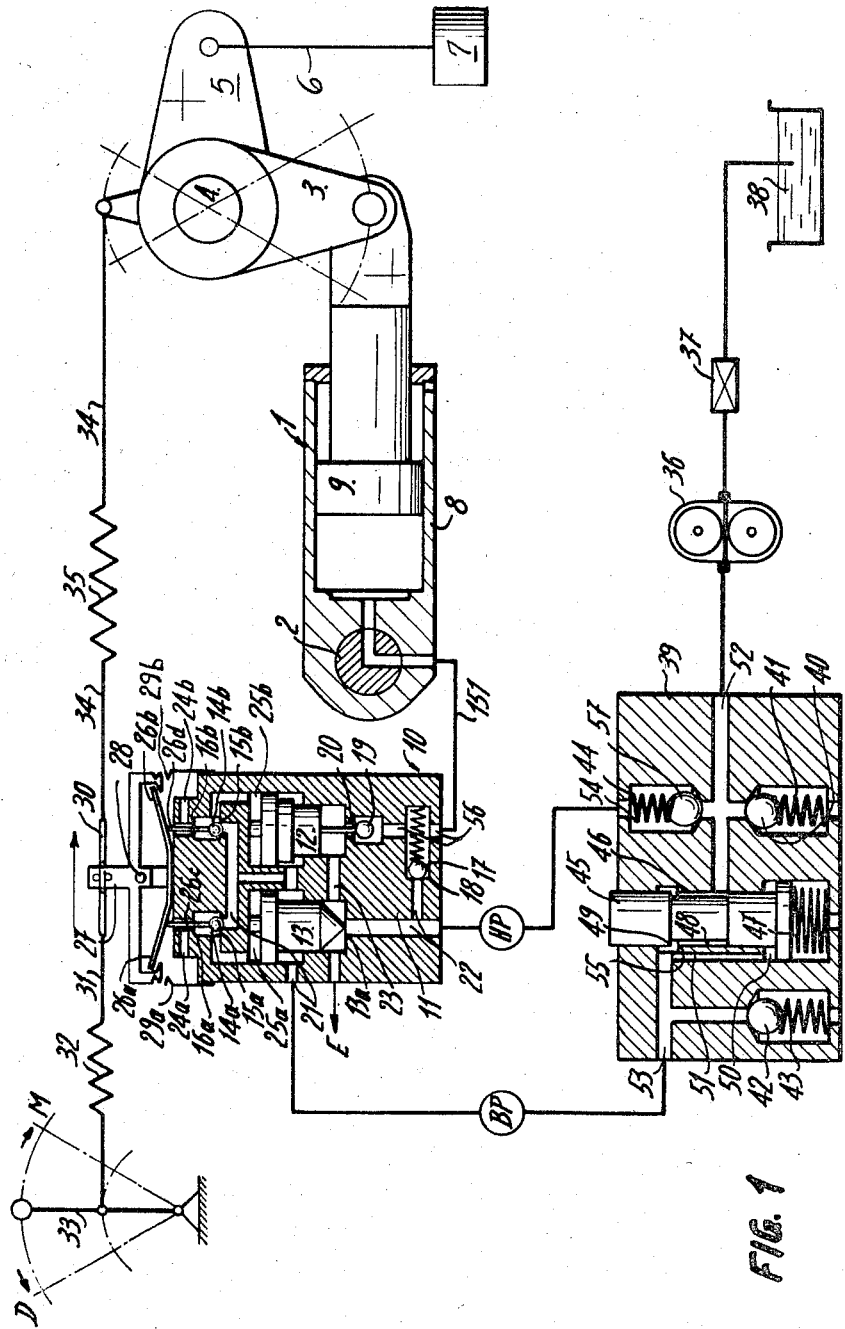
FIGURE 1 is a diagrammatic view of a complete arrangement with its control means.

Turning to FIGURE 1, the arrangement includes an auxiliary power unit engaging, on the one hand, a stationary point illustrated as a spindle 2 and, on the other hand, the end of a lever 3 which is adapted to rock around a rotary spindle 4. Said spindle 4 carries one or more other levers 5 arranged laterally and which carry by means of attaching means 6 which may comprise a rod or a cable, the load 7 to be handled. The auxiliary power unit includes a cylinder 8 inside which a piston 9 is adapted to slide.

The arrangement includes furthermore a controlling distributor 10 which comprises a body 11 inside of which are fitted a first differential piston 12 which, when moving vertically in a downward direction, produces a lowering of the load 7 to be handled while a second differential piston 13 engages, when it moves downwardly, a seat 13a and controls the raising of the load. The movements of said two pistons are controlled by the auxiliary valves constituted by two balls 14a and 14b engaging selectively corresponding seats 15a and 15b or other corresponding seats 16a and 16b. The distributor includes additionally a valve formed in the present instance by a third ball 17 engaging its seat 18 under the action of a spring and a still further valve comprising in the case illustrated, a fourth ball 19 which engages its seat 20 under the action of the oil pressure prevailing in the auxiliary power unit 1.

A low oil pressure supply BP, feeding channels 21 serves for shifting the pistons 12 and 13 under the control of the auxiliary valves 14a and 14b. A high oil pressure is fed through the HP pipe. Said pressure has a high value selected in accordance with the load to be raised. It feeds the channels 22 leading respectively to the seat 13a controlled by the piston 13 and to the seat 18 controlled by the ball valve 17. The channel 23 connected with the exhaust feeds oil through the vat into the pump to be described hereinafter. The channels 24a and 24b forming extensions of the seats 16a and 16b provided for the auxiliary valves 14a and 14b are also connected with the exhaust. Lastly, channels 25a and 25b connect the space surrounding the corresponding balls 14a or 14b with the chambers extending above the corresponding pistons 13 and 12 respectively.

A system of spring blades 26a and 26b exerts permanently by means of the small rods 26c and 26d respectively, a mechanical pressure on the corresponding balls 14a and 14b to hold the latter on their lower seats 15a and 15b whereby the latter close the channels 21 subjected to the pressure of the oil flowing in the low pressure system. A lever 27 adapted to rock around a spindle 28 and engaging the spring blades, produces, when it rocks towards the left hand side, a rising movement of the ball 14b whereas, when it rocks towards the right hand side, it raises the ball 14a. Two elastic blades 29a and 29b arranged laterally to either side of the body 11 are adapted to engage grooves provided for this purpose in the lever 27 whereby the latter may assume three positions of equilibrium, to wit:

(1) When the lever has rocked into its extreme left position, the blade 26b is raised while the left hand blade 26a depresses the ball 14a.

(2) In a medial position, the lever 27 is in a position of equilibrium half-way through its travel, both balls 14a and 14b engage their corresponding seats.

(3) When the lever has rocked completely to the right hand side, the blade 29b enters the corresponding groove and holds the lever in its rocked position while the left hand blade 26a is raised.

The movements of the lever 27 are controlled by a movable member or bar 30. To the left hand end of said bar is secured a cable 31 in which is inserted a spring 32 connecting said end with a hand-controlled lever 33. To the right hand end of said bar 30 are secured a cable 34 and a spring 35 connecting said bar with a point of the lever 3 forming part of the auxiliary driving unit constituting return motion means for the distributor 10.

The distributor is fed by a pump 36 which sucks its oil through a filter 37 out of a vat 38 collecting the oil passing out of the exhaust channels. Said oil under pressure reaches, through a pipe, an adjusting valve system or unit 39 constituted by two individual safety valves constituted each by a ball and a spring as shown at 40, 41 and 42, 43 respectively. Said adjusting unit includes furthermore a third valve constituted by a ball 57 subjected to the action of a spring 44 and lastly a pressure-reducing device constituted by a slide valve 45 sliding inside a bore 46. A spring 47 engages the slide valve and urges the latter upwardly. Around the slide valve, there is provided a groove 48 terminating with a ridge 49. The lower section of the slide valve has a larger diameter and defines with the body of the latter, a chamber 50 which is fed through a channel 51 so as to subject said slide valve 45 to a vertical downwardly directed thrust. Said unit includes furthermore a distributing channel 52 connected directly with the pump 36 and a channel 53 feeding the so-called low pressure circuit. The bore 46 housing the slide valve opens into the channel 53 through a section of a larger cross-section constituted by a groove forming with the remainder of said bore a sharp ridge 55. The high pressure circuit is connected at 54 with the downstream side of the ball 57.

The operation of the arrangement described is as follows:

When the pump 36 rotates, it produces an output of oil under pressure reaching the channel 52. When the pressure is reduced in the low pressure circuit at 53, the thrust exerted inside the chamber 50 is small. The spring 47 urges forwardly the slide valve 45, which has for its result to shift the ridge 49 away from the ridge 55 and allows thus a certain output of oil to feed the low pressure circuit. When the pressure increases in said circuit, it also increases at 50, which results in urging the slide valve downwardly and to reduce the spacing between the ridges 49 and 55 and thereby the output of oil feeding the low pressure circuit. The slide valve 45 operates as a pressure reducer. The ball 42 and the spring 43 thus form a safety valve which prevents the pressure from rising above the low pressure value which has been selected. The ball 40 and the spring 41 form a further safety valve adjusted to a value corresponding to that selected for the high pressure circuit. The ball 57 and the spring 44 form a valve which feeds the high pressure circuit as long as the incoming pressure is higher than that required for the low pressure circuit.

The low pressure circuit feeds through 21 the lower chambers of the differential pistons 12 and 13 and urges the latter upwardly. This low pressure circuit feeds the channels 21 up to the balls 14a and 14b, assuming that the lever 27 occupies its mean position as illustrated in the drawing.

Furthermore, the channels 22 fed by the high pressure circuit are connected directly with the exhaust when the piston 13 occupies its upper position. The pressure supplied by the pump at 52 is thus equal to the pressure selected for the low pressure circuit. Assuming now that a rising order is transmitted to the arrangement, the response is provided by merely shifting the control lever 33 in the desired direction, that illustrated at M. Said movement has for its result to reduce the traction transmitted by the spring 32 and consequently the stress acting from the right hand side to the left hand side on the bar 30. Since the stress transmitted by the spring 35 has not varied, the bar 30 is shifted towards the right hand side under the action of said spring 35. This latter movement produces a clockwise rocking of the lever 27 and raises the left hand blade 26a. The ball 14a is no longer urged onto its seat 15a by the stress exerted by said blade. It is therefore driven upwardly by the low pressure oil so as to bear against its upper seat 16a. This results connecting the channel 25a with the channel 21 and consequently making the pressure of the oil in the low pressure circuit appear at the upper end of the differential piston 13. This pressure produces on the latter a thrust which makes said piston sink so that it engages its lower seat 13a and closes the passage connecting the channels 22 and 23. The oil in the channel 22 can no longer flow out through the exhaust so that the pressure rises in the high pressure circuit until it raises the ball 17 off its seat 18. The oil passes then between the ball 17 and its seat 18 and feeds through the agency of channel 151 the auxiliary power unit 1. The pressure rises in the latter, which leads to a movement from the left to the right, of the piston 9, and consequently to a rising of the load 7 to be raised.

Said movement is produced through an anticlockwise rotary movement of the lever 3 to which are associated the return motion or follow up means. Said rotary movement slackens the spring 35 and continues as long as the lever 27 occupies its right hand rocked position. A moment is first reached at which the tractional stresses exerted on the bar 30 by the springs 32 and 35 are balanced after which the traction exerted by the spring 35 sinks underneath that produced by the spring 32, so that the lever 27 rocks and again enters its mean position illustrated in the drawing. The ball 14a engages then its seat 15a and the low pressure oil acts no longer on the upper surface of the piston 13 so that the latter rises and connects the channel 22 with the exhaust. The ball 17 engages again its seat 18 and the rising movement of the load 7 is stopped. Said load 7 is then reliably held at a predetermined height since the chamber 56 feeding the channel 151 is closed fluid-tightly under the action of the balls 17 and 19 engaging the corresponding seats 18 and 20.

When it is desired to lower the load, the lever 33 is pushed from the right hand side to the left hand side. The operation is similar to that described previously: the ball 14b moves away from its seat 15b and the low pressure oil acts on the upper surface of the piston 12 so as to lower the latter. Said piston urges the ball 19 downwardly so that the latter moves away from its seat 20. Said movement results in connecting the chamber 56 with the exhaust 23. The oil may now escape out of the auxiliary power unit. The weight of the load 7 urges the levers 5 and 3 together with the piston 9 into a movement from the right towards the left. The movement stops as described hereinabove when the traction exerted on the spring 35 by the lever 3 rises above that exerted by the spring 32 and returns the lever 27 into its mean position.

An advantage of the arrangement described resides in the fact that the controlling slide valve 10 is fed with oil under two different pressures. A low pressure of say 10 atmospheres serves for shifting the pistons 12 and 13 under the action of the auxiliary valves 14a and 14b and for controlling the operation. The leaks which always arise in such arrangements are clearly reduced by reason of the fact that said circuits are under a low pressure. The high pressure circuit feeds finally only one channel and raises a ball 17 in order to raise the load 7. When no operation is being executed, the high pressure oil flows directly out through the exhaust and this results in that the pressure supplied by the pump 36 approximates that of the low pressure circuit. In contradistinction, during operation, when the exhaust is closed, the pressure increases in the high pressure circuit and serves for raising the load 7. The pump 36 operates at a high pressure only when the load is being raised.

A further advantage is ascribable to the fact that the chamber 56 in the distributor 10 communicating directly with the auxiliary power unit 1 providing for the raising of the load is fluidtightly closed by two valves which may be constituted by balls 17 and 19 engaging the corresponding seats 18 and 20. There is no operative piston subjected to high pressure. Said structure cuts out all leaks in the controlling distributor. Consequently the load 7 remains stationary at a predetermined height under the action of the auxiliary power unit 1, except for the leaks in the latter which may be reduced by the provision of suitable packings.

Lastly a further advantage resides in the fact that when the pump 36 is inoperative, it is impossible to control a speedy downward movement of the load 7. As a matter of fact, when the distributor 10 is not fed by the low pressure circuit, the operation of the pistons 12 and 13 becomes impossible so that the two balls 17 and 19 remain in contacting relationship with the corresponding seats 18 and 20. Said impossibility of operation increases the reliability of the arrangement in so far that it prevents any movement unless the pump 36 has previously started operation.

Figure 2:
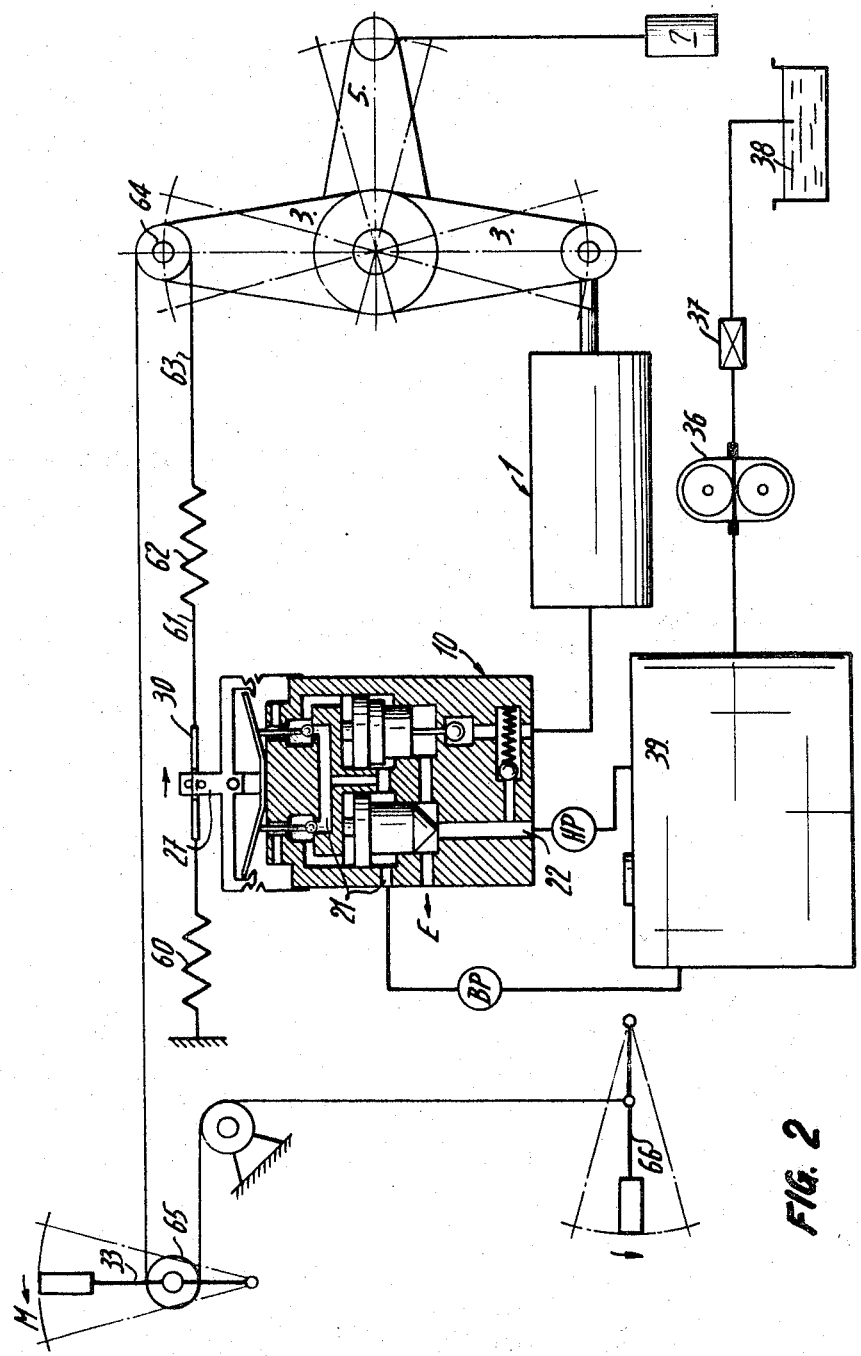
FIGURE 2 illustrates a similar arrangement incorporating modified control means.

FIGURE 2 illustrates a further embodiment of the invention which differs from the preceding arrangement by the different control system provided. Said arrangement includes the same chief components as those illustrated in FIGURE 1, said components being provided with the same reference numbers. The distributors 10 in FIGURE 2 correspond to the distributor 10 of FIGURE 1. The letters HP designate the high pressure input corresponding to the channel 22 of FIGURE 1; the reference letters BP designate the low pressure input corresponding to the channel 21 of FIGURE 1. The distributor 10 is identical with that illustrated in said FIGURE 1 and the lever 27 carries as previously a short bar 30. The left hand end of the latter is secured through a spring 60 to a stationary point. The right hand end of said bar is connected through a cable 61 to a spring 62. The cable includes an extension 63 passing over a pulley 64 carried by the lever 3 and thence it returns onto a second pulley 65 carried by a hand-controlled lever corresponding to the lever 33 of FIGURE 1 and its end is secured to a lever 66 controlled by outer return motion control means. The operation of the arrangement is similar to that illustrated in FIGURE 1.

Assuming for instance that the control lever 33 is operated by a leftward movement thereof; if the lever 66 is stationary, such a movement results in a tensioning of the spring 62 and consequently it causes the lever 27 to rock towards the right hand side, which produces, by means of the distributor 10 of the auxiliary power unit 1 and of the levers 3 and 5, a rising of the load 7. While said rising movement is being executed, the lever 3 rocks anticlockwise, which leads to sinking of the traction of the spring 62. When said traction has sunk to a sufficient extent, the spring 60 returns the control lever into its medial position and stops the movement. The lowering of the load is obtained through a reverse operation.

It should be noted that the presence of the lever 66 allows controlling the vertical movements of the load 7 from another control station. It is also possible to imagine that the lever 66 is controlled by an outer magnitude, such as, for instance in the case of an agricultural tractor, a feeler adapted to control the movements of said lever 66 in conformity to the depth of the furrow executed by the plough. Said control may be performed in a manner such that the depth remains constant, independently of the presence of any projecting sections of the surface of the field. Said feeler forms thus part of a detecting system defining a reference level constituted, in the case considered, by the ground level, which by means of the lever 66, acts on the distributor 10 so as to adjust automatically the height of the plough with reference to said reference level.

Figure 3:
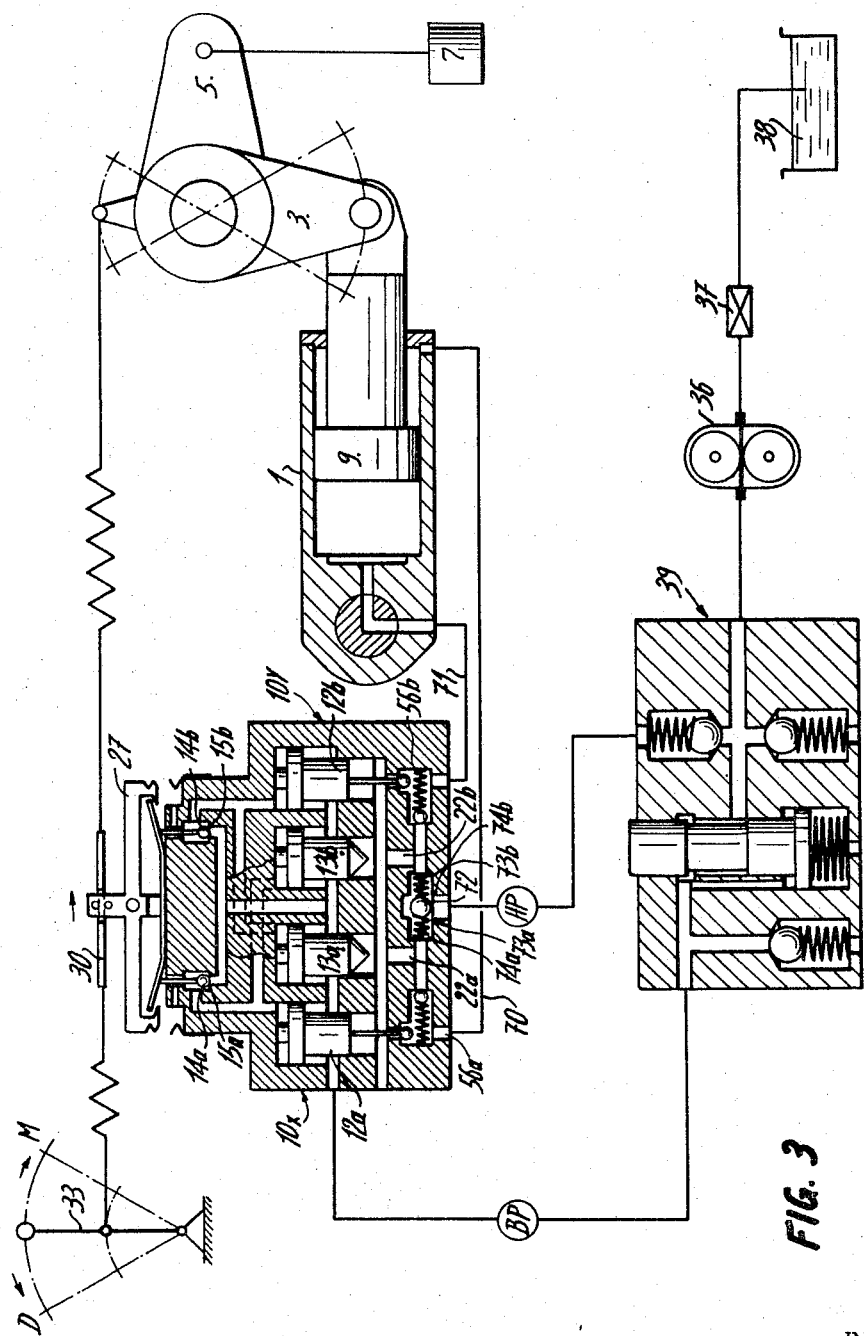
FIGURE 3 illustrates an arrangement incorporating an auxiliary double acting power unit together with its control distributor.

FIGURE 3 illustrates an arrangement of which the principle is the same as that underlying the arrangement of FIGURE 1, except that its distributor is duplicated and that the arrangement is adapted to control an auxiliary double acting power unit 1. The latter may exert an upwardly directed vertical stress so as to raise a load and furthermore a downwardly directed vertical stress so as to urge an object into the ground.

The principle of operation is the same as for the previously described arrangements. The general distributor includes two elementary distributors 10x, 10y which are coupled and are controlled by two auxiliary valves constituted, in the case illustrated, by two balls 14a and 14b. The differential pistons 12a and 13b, or 12b and 13a as the case may be, operate in parallel under the control of the corresponding ball 14a or 14b respectively.

Then the ball 14a is raised, it produces a downward movement of the pistons 12a and 13b through action of the low pressure on their upper surfaces. Said movement lowers the pressure inside the chamber 56a and consequently in the channel 70 connecting said chamber 56a with the right hand side of the auxiliary power unit 1, and simultaneously raises the pressure in the chamber 56b and consequently in the channel 71 connecting said chamber 56b with the left hand side of the auxiliary power unit 1. These modifications in pressure produce a shifting in a corresponding direction, that is towards the right hand side of the piston 9 of the auxiliary double acting power unit 1 and consequently a rising of the load, the reverse operation leading to a lowering of the load.

The distributor system 10x, 10y includes a further component constituted by a ball 72 adapted to selectively engage two seats 73a and 73b under the action of the corresponding springs 74a and 74b.

The operation of said further component is as follows: During normal operation, that is when no movement is being ordered, the pistons 12a–12b and 13a–13b remain in their upper positions illustrated in the drawing. The oil supplied by the pump 36 is fed by means of the adjusting unit 39 and the high pressure channel into the space between the ball 72 and its two seats 73a and 73b, since the ball 72 is held in a medial position under the action of the oppositely disposed springs 74a and 74b, and beyond said space the oil escapes through the clearance underneath the pistons 13a and 13b. During a rising movement of the load, the pistons 12a and 13b sink, which cuts out the flow of oil between the ball 72 and its seat 73b. The entire output is constrained to pass between the ball 72 and the seat 73a and this leads to an increased loss of head which urges the ball 72 in the direction of the flow of oil. The ball 72 engages thus the seat 73a so as to cut off the flow of oil escaping underneath the piston 13a. The pressure increases consequently in the channel 22b which holds the ball 72 in its position engaging the seat 73a.

The movement of the auxiliary power unit 1 stops when the lever 27 is returned into its medial position. The ball 14a engages its seat 15a and cuts off the low pressure so that the pistons 12a and 13b rise again. The pressure drops then inside the channel 22b. The ball 72 is subjected only to the stresses exerted by the springs 74a and 74b so that it returns into a position in the middle of its allowed travel.

Reversely for a downward movement of the load, the arrangement operates in a symmetrical reversed manner.

Figure 4:
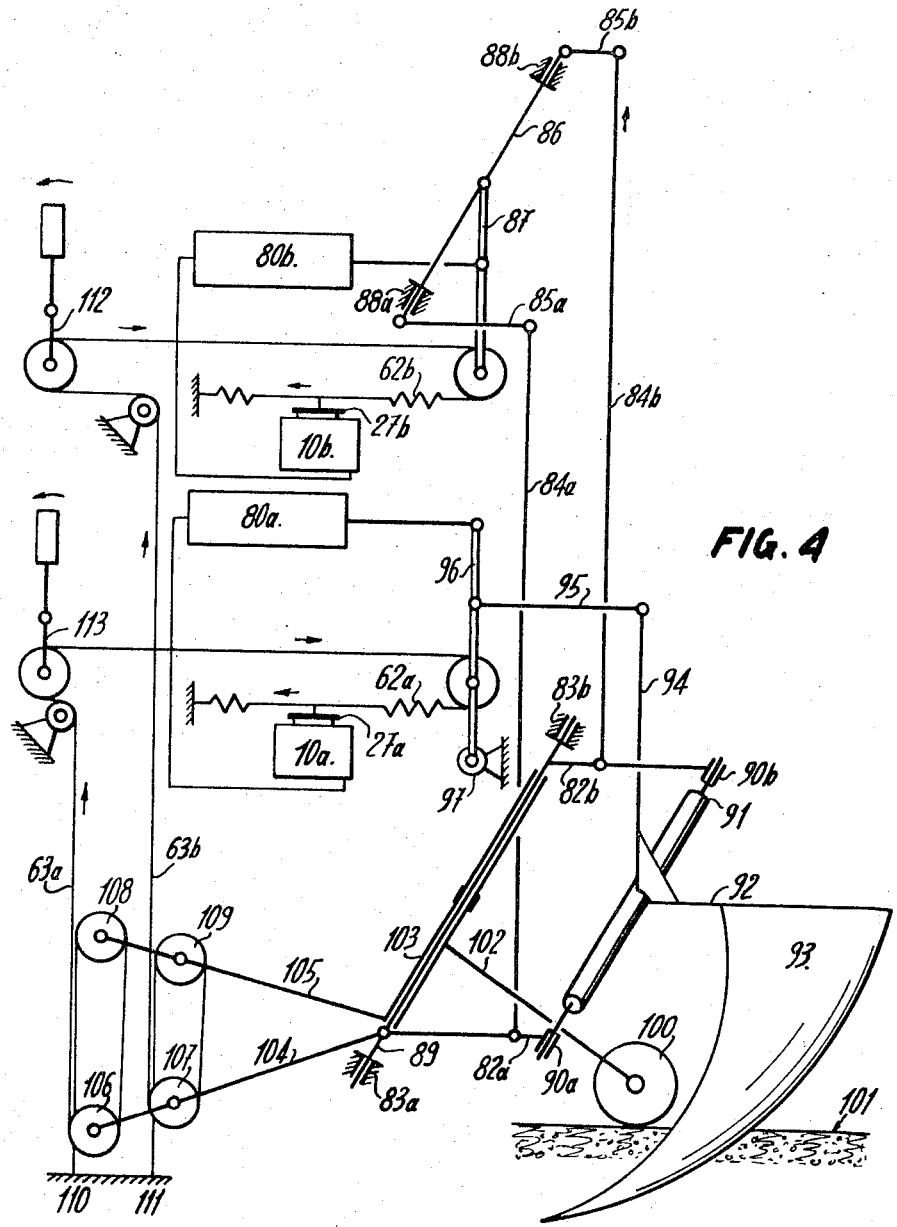
FIGURE 4 illustrates diagrammatically a complete arrangement adapted for use on a tractor and which allows an automatic adjustment of the depth of engagement of a plough and of its slope with reference to ground.

FIGURE 4 illustrates diagrammatically an application for which the load 7 is constituted by a plough 93. The arrangement of the components allows a permanent automatic control and adjustment of the depth of engagement of the plough and of its slope so as to adjust the angle between the plough and the ground. A large angle has a tendency to make the plough enter more deeply inside the ground and reversely. The arrangement according to FIGURE 4 includes the same essential components as in the precedingly described arrangements.

The distributors 10a and 10b are identical with those illustrated at 10 in FIGURES 1 or 3, according as to whether the auxiliary power units are of a single or double acting type. The distributor 10a acts on the auxiliary power unit 80a which controls the slope of the plough whereas the distributor 10b controls the auxiliary power unit 80b which adjusts the depth of engagement of the plough 93. The follow-up means are identical with those illustrated in FIGURE 2.

The plough 93 is carried by the tractor chassis through a pivotal link system including two bars 82a and 82b drawn by the tractor through the agency of a shaft 89 revolvably carried in the bearings 83a and 83b. The vertical position of the plough depends on the position of the rods 84a and 84b which are secured, through the levers 85a and 85b, to a shaft 86 rigidly carrying a lever 87. Said shaft is revolvably carried by two bearings 88a and 88b. A shifting of the piston of the auxiliary power unit 80b acting on the lever 87 has for its result to produce vertical movements of the rods 84a and 84b and a rotation of the shaft 89 in its bearings 83a and 83b and consequently a rising or lowering of the plough 93.

The right hand ends of the levers 82a and 82b form the bearings 90a and 90b respectively and said bearings carry a spindle 91 to which are secured on the one hand, an arm 92 carrying the plough 93 and on the other hand a second arm 94 the upper end of which is connected through a tie 95 with a lever 96. Said lever serves for adjusting the slope of the plough. It rocks around a pivot 97 and its angular position is controlled by the auxiliary power unit 80a. When it is desired to modify the slope of the plough, it is sufficient to shift the piston of said latter auxiliary power unit, which causes the arrangement carrying the plough to rock, by means of the levers 96 and 94, around the axis of the shaft 91. Said movement modifies the slope of the plough with reference to the ground. A roller 100 running over the untilled ground 101 is carried by a lever 102 rigidly secured to a hollow spindle 103 revolvably and coaxially carried by the spindle 89. The modifications in depth of the plough produce a modification in the angular settings of the spindles 89 and 103. A lever 104 is rigidly secured to the spindle 89 whereas a lever 105 is rigidly secured to the spindle 103. The levers 104 and 105 carry each a pair of rollers 106–107 or 108–109 respectively. An increase in the depth of engagement of the plough produces, by means of the levers, a movement of the pulleys 106 and 107 towards the pulleys 108 and 109 and reversely in the case of a reduction in the depth of engagement of the plough.

A cable 63a or 63b instead of being secured to a lever 66 as in the case of FIGURE 2 extends so as to be wound over the corresponding pairs of pulleys 106, 108 or 107, 109 acting after the manner of tackle blocks and the ends of said cables are anchored to the body of the tractor at corresponding points 110 and 111. The operation of the arrangement is the same as previously described. The hand-controlled levers 112 and 113 adjust the mean position of the plough with reference to ground. The return motion or follow-up means have for their object to correct the actual position as to depth 112 and as to slope 113 so as to make the plough remain in said mean position.

It has been shown that an increase in the depth of engagement of the plough, corresponding to a movement of the pulleys towards each other, has a tendency to slacken the cables 63a and 63b and consequently to allow the springs 62a and 62b to slacken. This leads to a rocking of the levers 27a and 27b in the distributors 10a and 10b from the right towards the left and consequently to a reduction in the slope of the plough and to a raising of the latter. The association of these two effects reduces the depth of the furrow.

A further advantage of such an arrangement consists in that it allows an increase of the vertical thrust exerted on the rear wheels of the tractor, which increases its adherence with reference to ground. As a matter of fact, assuming that the auxiliary power unit 80b has transiently no stress to exert, the depth of engagement of the plough 93 depends chiefly on its slope. The driver may act on the lever 112 so as to maintain constancy for the depth of engagement of the plough 93. An order of increase in slope has for its consequence an increase of the tractional stress transmitted through the rods 84a and 84b which prevent the lowering of the plough. This leads consequently to a larger vertical thrust through means of the bearings 88a and 88b on the tractor, which in turn leads to an increase in the pressure exerted through the tires and consequently in the adherence between the wheels and the ground.

FIGURE 5 illustrates a still further embodiment of the distributor 10 of the type illustrated in FIGURE 1, the principle of operation remaining the same. In this last embodiment, instead of controlling the two differential pistons 12 and 13 of FIGURE 1, by auxiliary valves formed by two balls, said auxiliary valves are replaced by an auxiliary slide valve 129 which is adapted to occupy selectively three different positions and to control the grooves 139 and 142 corresponding respectively to the channels 25a and 25b which are fed with oil under low pressure passing through the corresponding seats 15a and 15b. The embodiment illustrated in FIGURE 5 includes a ball 121 which is urged by a spring 122 against its seat 123. The chamber 124 on the downstream side of said ball is connected through a channel with the auxiliary power unit to be controlled and shown at S.M.

The distributor includes also two differential coaxial pistons. The outer piston 125 engages its seat 126 when it enters its lower position. The inner piston 127 sliding inside the outer piston 125 includes a downwardly extending rod passing through a central bore in the piston 125 so as to engage the ball 121 and to open the passage closed by the latter during a downwardly directed movement of the load.

The auxiliary slide valve 129 may occupy three different positions defined by a ball 130 urged by a spring 131 into engagement with the slide valve, which spring is housed in a bore formed in the upper section of the body 132 of said slide valve. Said ball 130 drops selectively into one of the three peripheral grooves 150 provided in the slide valve 129 so as to hold the latter in a predetermined position with reference to the body 132 in the absence of any controlling movement having for its object to shift the slide valve 129. The low pressure oil reaches, as previously described, the channel 133 and feeds permanently through a system of further channels, both chambers 134 and the groove 135.

In its medial position with reference to the body 132, the slide valve 129 closes the groove 135. All the channels and the chamber 136 are permanently connected with the exhaust, the oil returning directly into the container feeding oil to the pump. The oil in the high pressure circuit reaches the point 137 and feeds the chamber 138. The operation of said slide valve is as follows:

During normal operation, the slide valve 129 is in a medial position with reference to its allowed travel. The low pressure oil feeds the chambers 134 and pushes the two outer and inner pistons 125 and 127 against their upper abutments. Assuming now that the slide valve 129 is shifted in the direction indicated by the arrow M so as to produce a rising movement, said shifting results in a connection between the groove 135 and the groove 139 connected through a channel with a chamber 140. When pressure reaches said chamber 140, it produces a downwardly directed vertical thrust on the piston 125, which thrust is more energetic than that holding beforehand said outer piston 125 in its upper position. The lower frustoconical section 141 of said piston 125 engages the seat 126 and closes the port through which the high pressure oil was allowed to enter the exhaust channel. The pressure increases in said circuit and, when it is sufficient, it urges the ball 121 off its seat 123 so that the oil enters the chamber 124, and consequently the auxiliary power unit S. M. which controls the rising movement of the load.

It should be noted that the downward movement of the piston 125 produces a similar shifting of the piston 127, but its stroke is not sufficient for the lower rod at the lower end of the piston 127 to engage the ball 121 which remains on its seat as long as the rise in pressure inside the chamber 138 does not act on said piston. When the auxiliary power unit has executed its load-raising stroke, the slide valve 129 is returned into its medial position and the piston 125 rises and returns into the position illustrated in the drawing. To execute a downward movement of the load, the slide valve 129 is shifted in the direction of the arrow D which has for its result to connect the groove 135 with the groove 142 which feeds through a channel and the chamber 143, the chamber 144 provided above the upper end of the inner piston 127 between the outer piston 125 and said inner piston 127.

When oil pressure reaches said chamber 144, it produces, as precedingly, a vertical thrust which has for its result to shift the piston 127 downwardly. Said piston, as it sinks, engages the ball 121 and moves it off its seat 123. The oil contained inside the chamber 124 and consequently inside the controlled auxiliary power unit, escapes between the ball 121 and its seat 123. The downward movement of the load stops when the slide valve 129 has returned into its medial position.

It is an easy matter to show that it is possible to provide with the same distributor, the control of a double auxiliary power unit.

We claim:

1. A hydraulic control arrangement including at least one supply of oil under pressure, at least one hydraulic auxiliary power unit including a cylinder and a piston, at least one distributor feeding said oil into the auxiliary power unit with a view to controlling the desired movements of the latter, said distributor including at least one chamber connected, on the one hand, with the cylinder of the auxiliary power unit through a hydraulic channel and, on the other hand, with the supply of oil under pressure through a supply channel, wherein said distributor includes an exhaust channel, an exhaust port for said chamber, communicating with said exhaust channel, means to control exhaust of oil from said port, at least one valve closing said supply channel and ensuring the fluid tightness of said chamber when said chamber is subjected to an internal oil pressure greater than the pressure exerted by said supply of oil, the said means preventing exhaust of oil from said exhaust port, said supply channel communicating with the exhaust channel, said distributor further including at least two differential valves and two auxiliary valves, one differential valve controlling the flow of oil from the supply channel to the exhaust channel and one differential valve constituting the means to control the exhaust of oil from said port, and wherein an adjusting unit is located between said supply of oil and the distributor, said unit including pressure reducing means which divides the supply of oil into a high pressure channel and a low pressure channel, said high pressure channel communicating with the supply channel, and said low pressure channel communicating with the differential valves so that the supply of oil from said low pressure channel selectively activates the differential valves under the control of said auxiliary valves.

2. An arrangement as claimed in claim 1, wherein said auxiliary valves are selectively controlled by a movable system connected through mechanical and elastic means on the one hand with a hand-controlled member and on the other hand with a member controlled by the auxiliary power unit, whereby the distributor is controlled by the position of said member.

3. An arrangement as claimed in claim 2, wherein the two differential valves are arranged coaxially one inside the other, the outer valve controlling the flow of oil from the supply channel to the exhaust channel and the inner valve includes an extension constituted by a rod passing through an axial passage in the outer valve, said rod forming part of the means to control the exhaust of oil from said port.

4. An arrangement as claimed in claim 3, wherein said auxiliary valves are constituted by a distributing slide valve which also constitutes the movable system connected through an elastic and mechanical connection on the one hand with a hand-operable control member and on the other hand with the member controlled by the auxiliary power unit.

5. An arrangement as claimed in claim 4, wherein said valve closing the supply channel and an additional part of the means to control the flow of oil from said exhaust port are constituted by a common ball.

6. An arrangement as claimed in claim 2, in which the auxiliary power unit, through the member controlled thereby, is adapted to raise a load at a predetermined height with reference to a datum level, a mechanism detecting said datum level and acting on the distributor with a view to obtaining an automatic adjustment of the height at which the load is to be raised with reference to said datum level.

7. An arrangement as claimed in claim 6, applied to an agricultural tractor drawing a plough, which plough is pivotally connected to a pair of draft links which are in turn pivotally connected with the chassis of the tractor so as to allow on the one hand an adjustment of the depth of the furrow and on the other hand an adjustment of the slope of the plough, and wherein said member controlled by said auxiliary power unit is a crank arm having one arm connected with said auxiliary power unit and the other arm connected to said draft links thereby serving to adjust the depth of said plough under the control of the level detecting mechanism.

8. An arrangement as claimed in claim 7, including a second auxiliary power unit, a second distributor for controlling said second auxiliary power unit, and means between said second auxiliary power unit and said plough to pivot said plough about its pivotal connection with said draft links in response to movements of said second auxiliary power unit.

9. An arrangement as claimed in claim 8, wherein said mechanism detecting a datum level acts on said second distributor so as to adjust the slope of the plough automatically in conformity with the depth of engagement of the plough.

References Cited by the Examiner

UNITED STATES PATENTS

| 2,726,680 | 12/1955 | Baines. | |
|---|---|---|---|
| 2,770,098 | 11/1956 | Korkowski et al. | 60—52 |
| 3,171,496 | 2/1965 | Nelson | 172—9 |
| 3,190,186 | 6/1965 | Molly. | |

FOREIGN PATENTS

| 1,273,641 | 9/1961 | France. |
|---|---|---|
| 1,154,965 | 9/1963 | Germany. |
| 851,340 | 10/1960 | Great Britain. |
| 897,779 | 5/1962 | Great Britain. |

ABRAHAM G. STONE, *Primary Examiner.*

R. L. HOLLISTER, *Assistant Examiner.*